(12) United States Patent
Jones et al.

(10) Patent No.: US 8,371,076 B2
(45) Date of Patent: Feb. 12, 2013

(54) SOLAR PANEL SUPPORT MODULE AND METHOD OF CREATING ARRAY OF INTERCHANGEABLE AND SUBSTITUTABLE SOLAR PANEL SUPPORT MODULES

(75) Inventors: Jeremy Jones, Tampa, FL (US); Jean S. Roy, Chicago, IL (US)

(73) Assignee: Socore Energy LLC, Chicago, IL (US)

( * ) Notice: Subject to any disclaimer, the term of this patent is extended or adjusted under 35 U.S.C. 154(b) by 730 days.

(21) Appl. No.: 12/196,072

(22) Filed: Aug. 21, 2008

(65) Prior Publication Data

US 2010/0043781 A1 Feb. 25, 2010

(51) Int. Cl.
*E04D 13/18* (2006.01)
*F24J 2/46* (2006.01)

(52) U.S. Cl. ...... 52/173.3; 52/282.2; 126/704; 136/244; 248/148

(58) Field of Classification Search .............. 52/173.3, 52/582.1, 586.1, 586.2, 282.2, 282.3, 282.4, 52/285.3, 285.4; 248/148, 237; 126/704; 126/623; 136/244, 245
See application file for complete search history.

(56) References Cited

U.S. PATENT DOCUMENTS

| | | | | |
|---|---|---|---|---|
| 3,778,175 | A * | 12/1973 | Zimmer | 403/187 |
| 4,026,084 | A * | 5/1977 | Goose | 52/780 |
| 5,121,583 | A * | 6/1992 | Hirai et al. | 52/90.1 |
| 5,409,549 | A * | 4/1995 | Mori | 136/244 |
| 5,706,617 | A * | 1/1998 | Hirai et al. | 52/173.3 |
| 5,857,304 | A * | 1/1999 | Karten et al. | 52/582.1 |
| 5,887,406 | A * | 3/1999 | Bond | 52/749.12 |
| 6,105,316 | A * | 8/2000 | Bottger et al. | 52/173.3 |
| 6,606,823 | B1 * | 8/2003 | McDonough et al. | 47/65.9 |
| 6,968,654 | B2 * | 11/2005 | Moulder et al. | 52/173.3 |
| RE38,988 | E * | 2/2006 | Dinwoodie | 136/251 |
| 7,012,188 | B2 * | 3/2006 | Erling | 136/251 |
| 7,260,918 | B2 * | 8/2007 | Liebendorfer | 52/173.3 |
| 7,434,362 | B2 * | 10/2008 | Liebendorfer | 52/173.3 |
| 7,600,349 | B2 * | 10/2009 | Liebendorfer | 52/173.3 |
| 7,748,175 | B2 * | 7/2010 | Liebendorfer | 52/173.3 |
| 7,766,292 | B2 * | 8/2010 | Liebendorfer | 248/237 |
| 7,819,114 | B2 * | 10/2010 | Augenbraun et al. | 126/623 |
| 8,109,048 | B2 * | 2/2012 | West et al. | 52/173.3 |
| 8,109,049 | B2 * | 2/2012 | Suganuma et al. | 52/173.3 |
| 8,128,044 | B2 * | 3/2012 | Liebendorfer | 248/237 |

(Continued)

FOREIGN PATENT DOCUMENTS

| | | | |
|---|---|---|---|
| DE | 19934059 A1 * | 2/2001 | |
| DE | 10309534 A1 * | 9/2003 | |

(Continued)

*Primary Examiner* — Basil Katcheves
*Assistant Examiner* — Rodney Mintz
(74) *Attorney, Agent, or Firm* — Reed Smith, LLP

(57) ABSTRACT

A solar panel array support system including a plurality of removable, interengaged adjacent support modules of similar configuration. Each support module mounts a PV solar panel, and also a DC-AC inverter electrically connected to the solar panel. The DC-AC inverter is also electrically connectable to additional DC-AC inverters mounted to the adjacent solar panel support modules. Each support module includes flexible male connector elements that enter a slot forming a female connector element in an adjacent support module to pivotally and removably engage each support module to another. Individual modules or a plurality of solar panel support modules can be readily removed from and replaced in a solar panel array, and can be readily removed and installed to form a second modular solar panel array.

6 Claims, 9 Drawing Sheets

U.S. PATENT DOCUMENTS

| | | | | |
|---|---|---|---|---|
| 8,250,829 | B2 * | 8/2012 | McPheeters et al. | 52/710 |
| 2003/0015636 | A1 * | 1/2003 | Liebendorfer | 248/237 |
| 2003/0015637 | A1 * | 1/2003 | Liebendorfer | 248/237 |
| 2004/0163338 | A1 * | 8/2004 | Liebendorfer | 52/173.1 |
| 2004/0187909 | A1 * | 9/2004 | Sato et al. | 136/251 |
| 2005/0166955 | A1 * | 8/2005 | Nath et al. | 136/251 |
| 2005/0217716 | A1 * | 10/2005 | Masuda et al. | 136/244 |
| 2006/0196128 | A1 * | 9/2006 | Duke | 52/173.3 |
| 2007/0262204 | A1 * | 11/2007 | Beidleman et al. | 244/172.6 |
| 2007/0295392 | A1 * | 12/2007 | Cinnamon | 136/251 |
| 2008/0010915 | A1 * | 1/2008 | Liebendorfer | 52/173.3 |
| 2008/0172955 | A1 * | 7/2008 | McClintock et al. | 52/173.3 |
| 2008/0257402 | A1 * | 10/2008 | Kamp et al. | 136/251 |
| 2009/0019796 | A1 * | 1/2009 | Liebendorfer | 52/173.3 |
| 2009/0133690 | A1 * | 5/2009 | Nikiforov et al. | 126/704 |
| 2009/0293864 | A1 * | 12/2009 | Augenbraun et al. | 126/623 |
| 2010/0064605 | A1 * | 3/2010 | Corvaglia et al. | 52/173.3 |
| 2010/0212715 | A1 * | 8/2010 | Almy et al. | 136/245 |
| 2010/0263297 | A1 * | 10/2010 | Liebendorfer | 52/11 |
| 2010/0293874 | A1 * | 11/2010 | Liebendorfer | 52/173.3 |
| 2011/0000519 | A1 * | 1/2011 | West | 136/244 |
| 2011/0108083 | A1 * | 5/2011 | Ravestein et al. | 136/244 |
| 2011/0138710 | A1 * | 6/2011 | Reisdorf et al. | 52/173.3 |
| 2011/0146669 | A1 * | 6/2011 | Bartol et al. | 126/704 |
| 2011/0162299 | A1 * | 7/2011 | Azzolini | 52/173.3 |
| 2011/0162639 | A1 * | 7/2011 | Jeandeaud | 126/634 |
| 2011/0263067 | A1 * | 10/2011 | Vaid et al. | 438/65 |
| 2012/0091297 | A1 * | 4/2012 | Rees | 248/126 |
| 2012/0216850 | A1 * | 8/2012 | Chu | 136/245 |

FOREIGN PATENT DOCUMENTS

| | | | |
|---|---|---|---|
| DE | 10321422 A1 | * | 1/2005 |
| DE | 102006053830 B3 | * | 2/2008 |
| EP | 2080963 A2 | * | 7/2009 |
| EP | 2221556 A2 | * | 8/2010 |
| JP | 2004238997 A | * | 8/2004 |

* cited by examiner

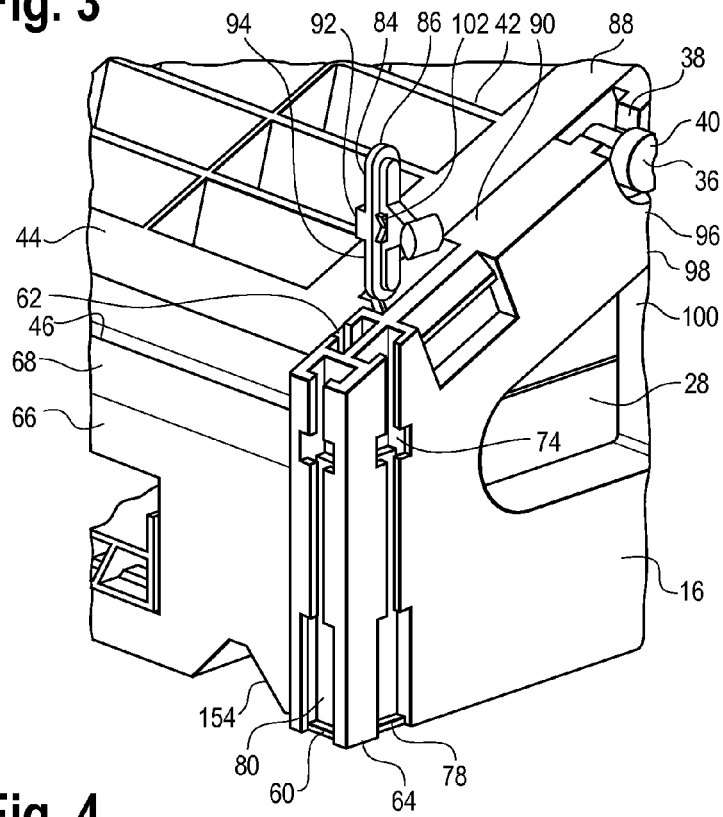
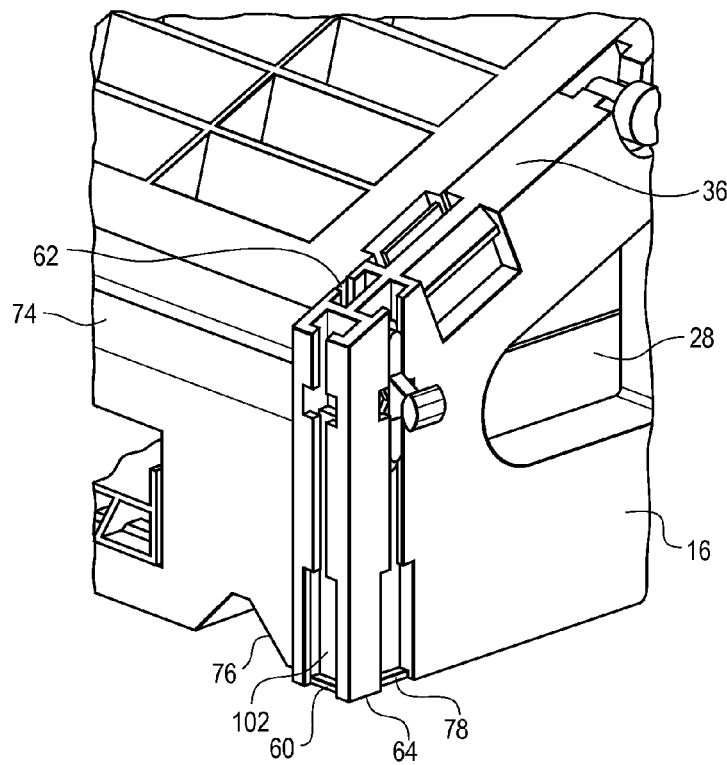

SOLAR PANEL SUPPORT MODULE AND METHOD OF CREATING ARRAY OF INTERCHANGEABLE AND SUBSTITUTABLE SOLAR PANEL SUPPORT MODULES

The present invention relates to solar panel support modules and a method of interengaging a plurality of similarly constructed modules to form an array of solar panels extending over a surface, such as the roof of a building. Each module is removable from a given array, and can be added to or substituted when necessary in the same array or another solar panel array at a different location. Each module includes a PV solar panel and a micro-inverter electrically connected to the module-supported solar panel and to adjacent solar panels in the array.

BACKGROUND OF THE INVENTION

Photovoltaic (PV) solar panels that generate electrical power from the sun's energy are known. In commercial and residential environments, these panels are mounted on a support made usually of iron or extruded aluminum, and are typically arranged over the roof of a building, such as an office building, shopping mall or residential structure, and either attached directly to the roof or are ballasted or weighed down to the roof using concrete block. Many present solar panel arrays are formed by several support structure elements that are brought to the roof in pieces, and then constructed and assembled on the roof. These structures are then physically and permanently or semi-permanently fastened to one another and placed on the rooftop as permanent fixtures designed to be on the roof for a long period of time. Since rooftops generally are not always flat, and may have a variable or undulating surface, it is difficult to uniformly and evenly seat such permanent or semi permanent support structures on an undulating or variable surfaced roof.

For the most part, current solar panel systems are typically assembled on-site. The assembly on-site includes the mounting structure itself, attaching the solar panel to the mounting structure, installing the wiring for the solar panels, and connecting the entire system together. A solar installation also requires a DC-AC inverter. In addition, present solar panel support structures comprise a plurality of solar panels that are electrically connected to one another, and the entire structure is then connected to a centralized, large DC-AC inverter inside the building structure. These solar panel structures cannot be independently monitored. "String" inverters are also currently available that link, or "string", multiple solar panels to a common inverter. A number of string inverters can be connected together to form the entire array. However, string inverters do not provide monitoring at the solar panel level, have a relatively short life span, and are not available in a modular construction.

Also, present solar panel support structures that are permanently or semi-permanently interconnected are not readily movable as individual units to a different location, such as when a roof must be replaced, end of a contract term, or the like. Also, current solar panel systems cannot be easily reconfigured into a new system, such as reconfiguring a 100 kW array as two 50 kW arrays, or two 100 kW arrays could become one 200 kW array. Present solar panel support structures do not include separate micro-inverters that allow each solar panel or an individual support structure to be separately monitored.

A need exists for solar panel support modules that can be removably connected to one another on a variable surfaced or undulating roof, that can be easily disconnected from an adjacent module and moved to a second location, and that have independent micro-inverters that can be interconnected at will in a second solar panel array system.

SUMMARY OF THE INVENTION

The present invention is an apparatus and method of providing a solar energy electrical generation system comprising an array of removably interengable PV solar panel support modules. The support modules are each uniformly constructed and are configured to be interengaged both front to back and side to side by a male-female pivot connection to create a system formed into an array of solar panel support modules that are removably and flexibly attached to each other, whereby one or more modular units can be removed from a first array and readily substituted into the same array or into a second array. Each support module is flexibly and removably connected to an adjacent module by a unique pivot connection to accommodate placement of the modules on a rooftop having a variable or undulating surface. In the illustrated embodiment, each support module includes an individual micro-inverter adapted to be electrically interconnected to the solar panel supported by the module, and also to be connected via quick connect/quick disconnect assemblies to the micro-inverters mounted on adjacent solar panel modules forming the array. This allows each solar panel to be monitored individually, and allows each support module and its associated solar panel to be moved to and substituted into a second array, and re-installed in the original array. Also, a complete solar panel array is built unit-by-unit, by connecting together the desired number of support modules that each mount a solar panel and a micro-inverter. The present invention also contemplates the use of integral solar panels and micro-inverters, as available.

Each support module is also configured to deflect winds that tend to lift the modules from the rooftop, and to provide support for weight objects that also tend to hold the module in contact with the rooftop in the presence of high winds. A wind deflector of each module is mounted to or forms a part of the module. In the illustrated embodiment, the wind deflector is pivotally mounted to the module to provide selective access to the volume below the solar panel for the purpose of accessing the micro-inverters for maintenance, or to add or remove weight objects from the support provided beneath the solar panel, or to perform other maintenance functions. Each module is also configured with apertures and channels to allow air to pass beneath and over the solar panel for the purpose of heat dissipation, and to allow access to the volume beneath the solar panel through the apertures and channels.

A need also exists for solar panel support modules designed to stack one on top of the other for ease of shipment to or from an installation site. A need also exists for a solar panel support module to be preassembled with the solar panel, micro-inverter and wiring in place on the module prior to delivering the assembled module to the installation site. At the installation site, the pre-assembled modules of the present invention are mechanically interengaged and electrically connected to each other. This requires less labor and less time to construct the rooftop array, thus providing cost savings.

BRIEF DESCRIPTION OF THE DRAWINGS

Certain examples of the present invention are illustrated by the accompanying figures. It should be understood that the figures are not necessarily to scale and that details that are not necessary for an understanding of the invention or that render other details difficult to perceive may be omitted. It should be understood, of course, that the invention is not necessarily limited to the particular examples illustrated herein.

FIG. 3 is a detail perspective view of one corner of the support module of FIG. 1, showing a pivot connection element about to be inserted into a receiving slot in the support module;

FIG. 4 is a detail perspective view of the corner of the support module shown in FIG. 3, illustrating the pivot connection element inserted into the receiving slot in the support module;

FIG. 17 is a perspective detail view of a typical micro-inverter used in the present invention; and.

DETAILED DESCRIPTION

Figure 1:
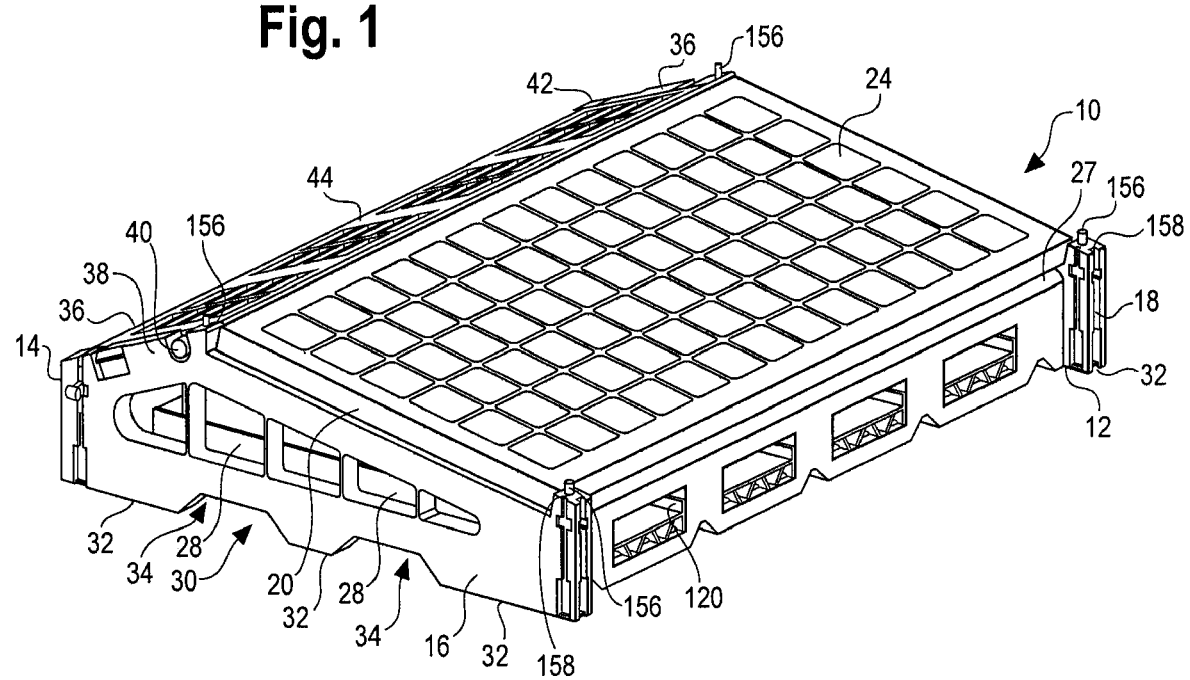
FIG. 1 is a perspective view of the solar panel support module of the present invention, with a PV solar panel attached.

Referring to FIG. 1, the solar panel support module of the present invention is generally designated by the numeral 10, and comprises a front panel 12, a rear panel 14, and side panels 16, 18, each made of plastic or other suitable material.

Each of the side panels 16, 18 has a slanted, substantially flat upper surface 20, 22 (FIG. 9) upon which PV solar panel 24 is placed. Solar panel 24 is attached on its long edges to the upper surface 27 of front panel 12 and to a beam 29 (FIG. 9) extending from side panel 16 to side panel 18, such as by screw s 26 (FIG. 15), or other suitable fasteners or integral mounting structures as are known in the art. Solar panel 24 is also supported on its long edges by the upper surface 27 of front panel 12 and to a beam 29 (FIG. 9) extending from side panel 16 to side panel 18. As seen in FIG. 1, solar panel 24 slants downward towards front panel 12 at an angle of five degrees or more. Each side panel 16, 18 also includes a plurality of apertures 28 adapted to allow air to pass into and out of volume 30 (FIGS. 1, 9) beneath solar panel 24 for purposes of heat dissipation and the reduction of lifting forces on the underside of solar panel 24, as will be explained.

Figure 7:
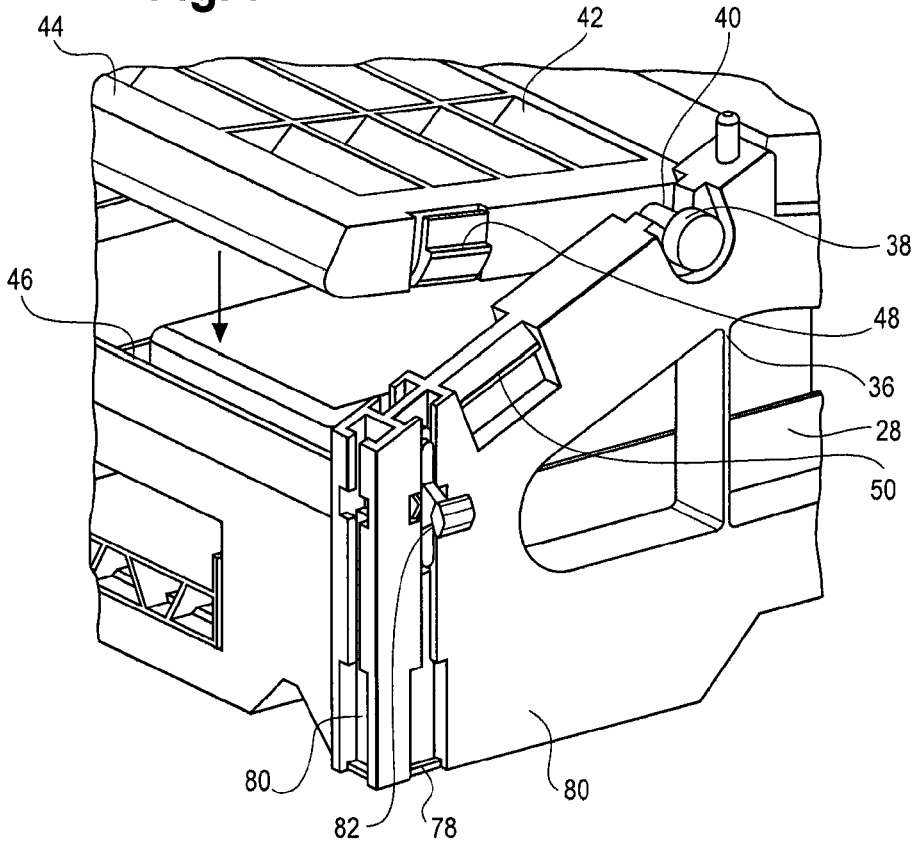
FIG. 7 is a detail perspective view of a corner of an embodiment of the support module of FIG. 1, showing the pivotal access panel in a slightly raised position and the releasable lock that holds the access panel in its closed position.
Figure 8:
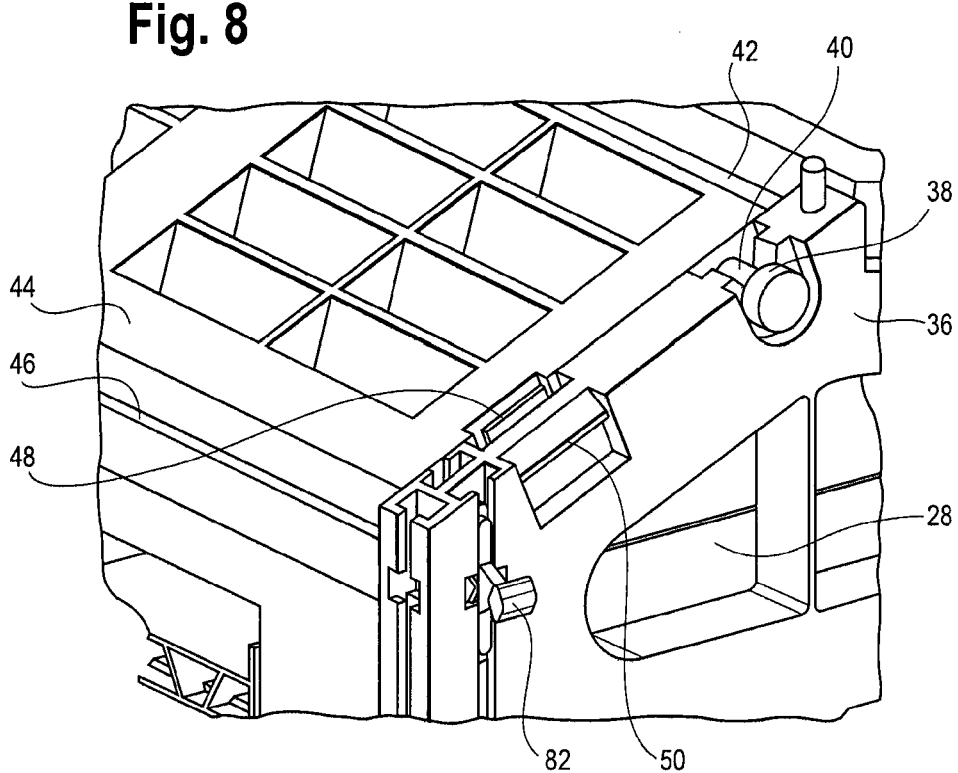
FIG. 8 is a detail perspective of the corner of the support module shown in FIG. 7, showing the access panel held in its closed position by the releasable lock.

The bottom portion of each side panel 16, 18 also includes a plurality of feet 32 adapted to support module 10 on the rooftop of a building (not shown). The large number of feet 32 are configured to help distribute the overall weight of the array of modules 10 throughout multiple points of contact with the roof. Channels 34 are formed between feet 32, whereby air is also permitted to flow into and out of volume 30 through channels 34. Module 10 is configured with apertures 28, apertures in the front and rear panels 12, 14 and apertures in access panel 42 to allow air to enter volume 30 and dissipate heat. By incorporating these apertures and channels in the structure of module 10, less plastic is used to produce the module, the resulting truss configuration provides added strength, and the requisite heat dissipation is achieved. Each side panel 16, 18 also includes a rearwardly facing, downwardly extending flat surface 36 that ends at rear panel 14. In the illustrated embodiment, a groove 38 is formed in each flat surface 36 of side panels 16, 18, and pivot pins 40 extending from pivotal access panel 42 are received in each groove 38 to pivotally mount access panel 42 to support module 10. The rearward portion 44 of access panel 42, in its closed position as shown in FIG. 8, rests upon upper flat surface 46 of rear panel 14 (FIG. 7). Access panel 42 acts as a wind deflector in the closed position, directing wind from the rear of module 10 over the access panel 42 and over the top of solar panel 24.

As seen in FIGS. 7 and 8 of the illustrated embodiment, pivotal access panel 42 includes a flange 48 that is grasped by moveable latch 50 when access panel 42 is in its lowered position to maintain the access panel in its closed position until it is desired to open the access panel to gain access to volume 30 in the interior of support module 10. By manually or mechanically moving latch 50 outward, the latch 50 and flange 48 became disengaged, allowing access panel 42 to freely pivot up and down on pivot pins 40. Flange 48 and latch 50 can be on one or both lateral sides of access panel 42, or one or two flange and lock structures can be located in the center on the front of access panel 42 and on rear panel 14, as desired.

Figure 14:
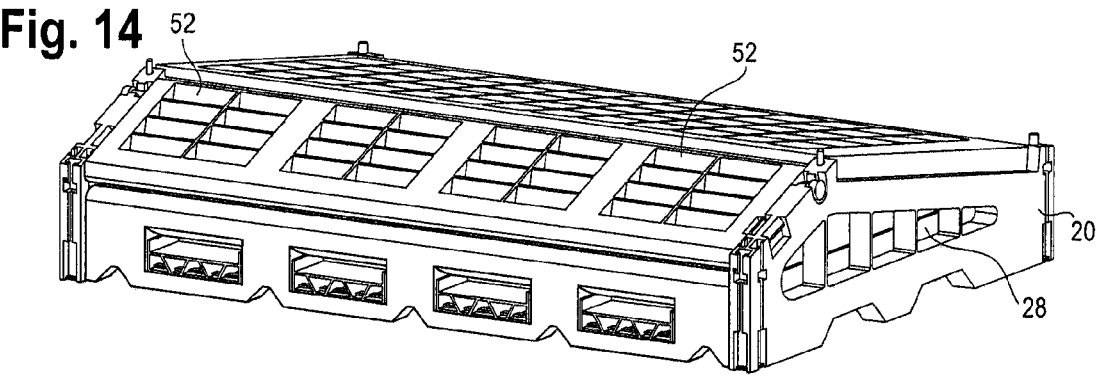
FIG. 14 is a rear side perspective view of the support module and PV solar panel of FIG. 1, showing a plurality of louvers in the pivotal access panel.
Figure 15:
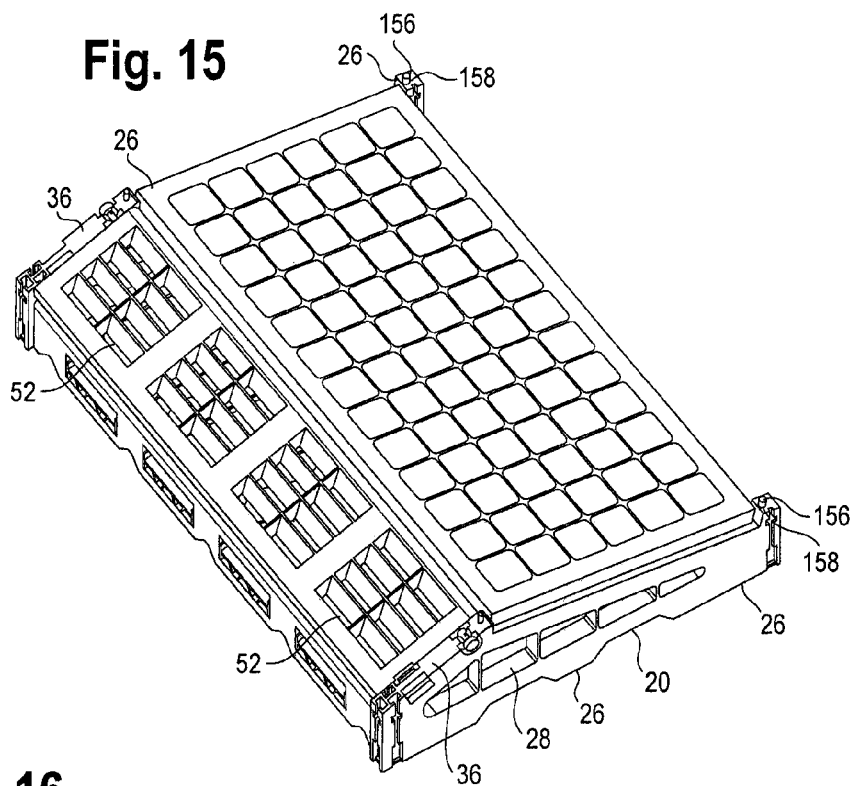
FIG. 15 is top perspective view of the support module and PV solar panel of FIG. 14, also showing the louvers in the pivotal access panel.
Figure 16:
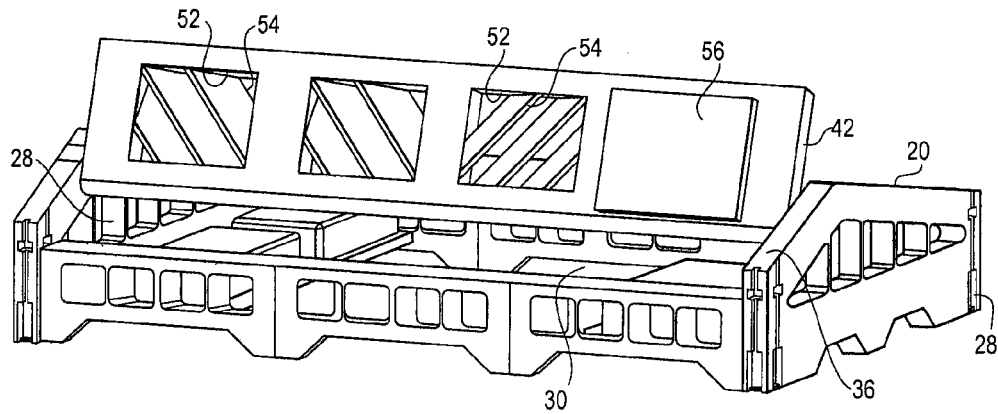
FIG. 16 is a perspective rear view of the support module of FIG. 1, showing a micro-inverter lodged in one of the apertures formed in the pivotal access panel.
Figure 17:
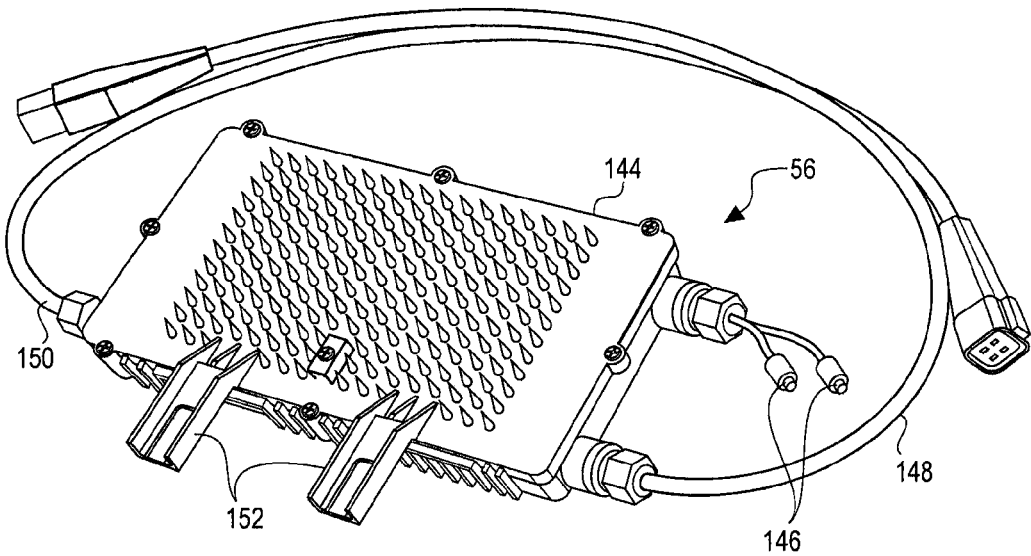

Referring to FIGS. 14, 15 and 16 of the illustrated embodiment, access panel 42 includes a plurality of relatively large apertures 52. A plurality of louvers 54 are disposed in each aperture for the purpose of diverting a majority of the wind passing over the rear panel 14 over the top of solar panel 24 to decrease lift forces acting on the module 10. As seen in FIG. 16, in the illustrated embodiment one of the apertures 52 is used to mount a micro-inverter 56 that converts DC energy created by solar panel 24 into AC energy at the solar panel 24 level by running AC power out of each panel. Since the weakest solar panel 24 defines the total power output of a system, with micro-inverter 56 each solar panel provides its maximum power output, and each individual solar panel module 10 is provided with portability. Further details of micro-inverter 56 are shown in FIG. 17, and are described below. While micro-inverter 56 is shown located in one of the apertures 52 of access panel 42, the micro-inverter can be located at any other suitable position on support module 10 as desired, or be integrated with the solar panel 24.

Figure 5:
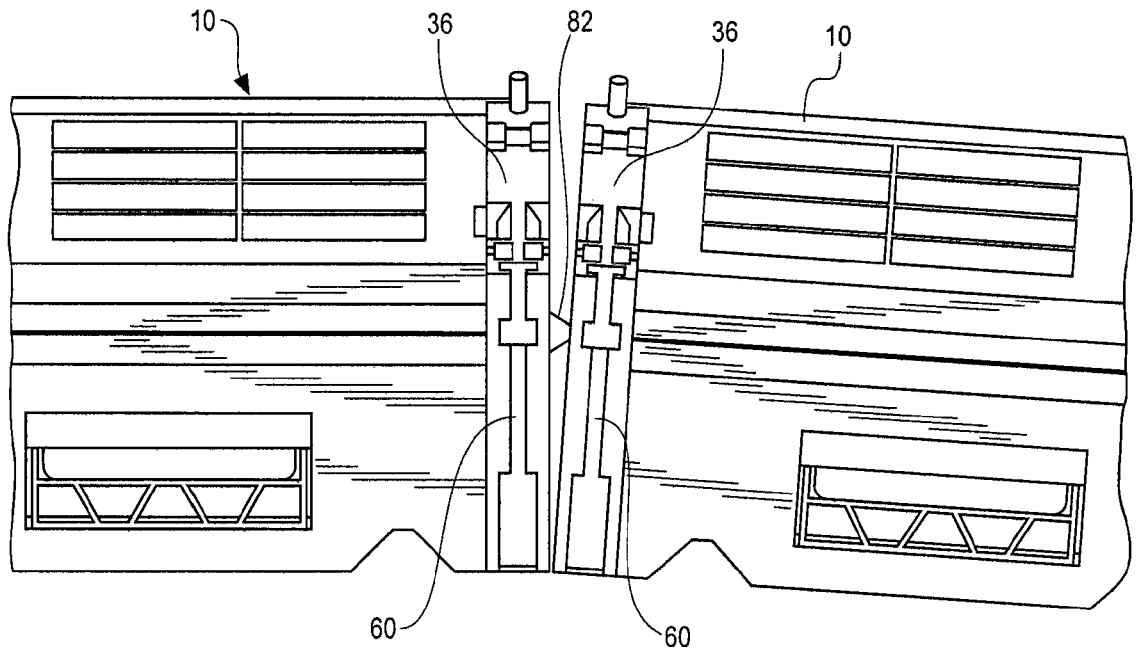
FIG. 5 is a rear elevation view showing two adjacent support modules of FIG. 1, flexibly interengaged by the flexible pivot connection element of FIGS. 3 and 4.
Figure 5A:
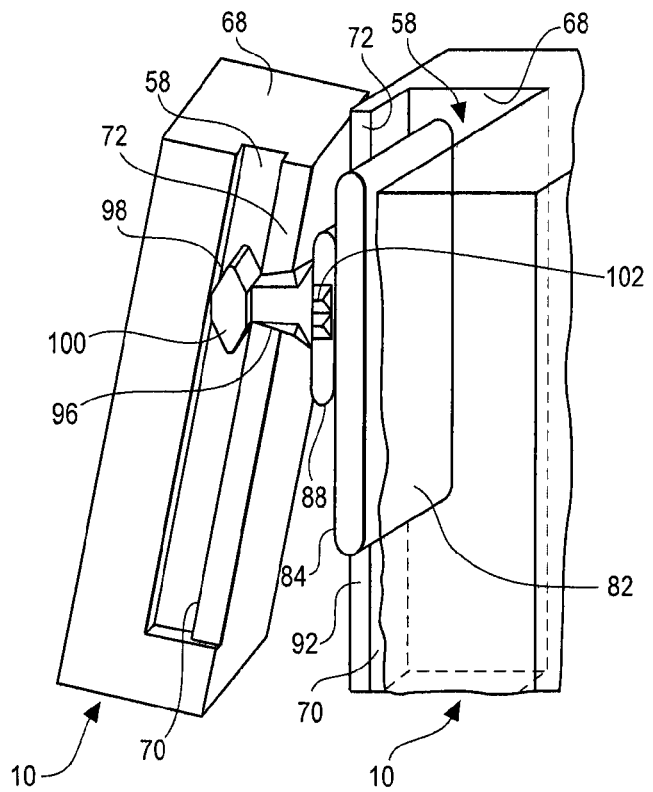
FIG. 5A is a detail cut-away view of the male pivot connector of one support module inserted into the female connector element of an adjacent support module on an uneven rooftop.
Figure 6:
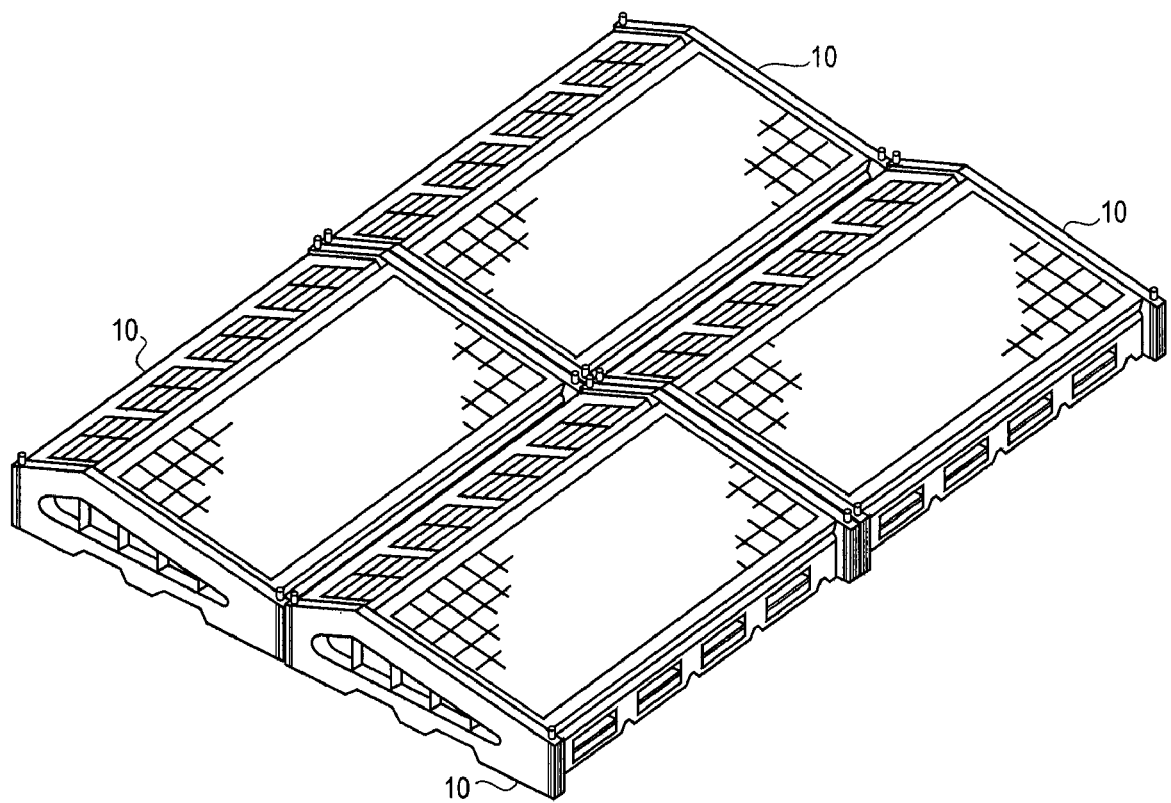
FIG. 6 is a diagram of a plurality of solar panel support modules of FIG. 1 flexibly interengaged to form an array of solar panel support modules.

As stated previously and as illustrated in FIG. 6, each solar panel support module 10 is configured to interengage with one or more additional support modules 10, allowing a module 10, or series of modules 10, to be removed from, or added to, an existing array of support modules. One embodiment of the present invention adapted to provide this function is illustrated in FIGS. 3, 4, 5 and 5A, wherein three female connector elements comprising T slots 58, 60, and 62 extend vertically in both corners 64 of each side panel 16, 18. Although only one corner 64 and one series of three female connector T slots 58, 60, 62 are illustrated in FIGS. 3-5, the three T slots 58, 60, 62 are located in similar fashion in all four corners of the support module 10. Each series of three T slots is disposed at both ends of side panel 16, and at both ends of side panel 18.

Referring to FIGS. 3 and 4, the configuration of T slots 58, 60 and 62 at corner 64 of side panel 16 will be explained, with the understanding that the same configuration description is applicable to the remaining three corners of side panels 16 and 18. Also, each T slot 58, 60, 62 is configured the same, and extends along the entire height of corner 64. Each slot 58, 60 and 62 includes a back wall 66, two opposed side walls 68, and a front wall 70 having a longitudinal gap 72 formed in the front wall. Gap 72 has a first widened portion 74 formed partway down the length of the gap. A stop member 76 is disposed adjacent back wall 66 of each T slot 58, 60, 62 and in the illustrated embodiment, stop member 76 extends to the bottom of each T slot, where the bottom of the stop member 76 abuts a horizontally extending flange 78. The lower end of gap 72 in each T slot includes a second widened portion 80 that extends laterally from one side wall 68 to the other.

The present invention includes a unique flexible male pivot connector element generally designated by the numeral 82 in FIGS. 3 and 4 for the purpose of manually and flexibly interconnecting one support module 10 to another. Male pivot connector element 82 is made of an inherently flexible, but strong material such as nylon or other suitable material. The main body 84 of pivot connector 82 has rounded edges 86 on both upper and lower ends, and an extended body portion 88, with rounded edges 90 is formed on the upper and lower ends of the extended body portion 88. The width of main body 84 is slightly less than the width of each female T slot 58, 60, 62 measured between side walls 68. The width of extended body portion 88 is substantially the same as the width of gap 72. A stop flange 92 extends outwardly from the rear of main body 84, and a flat surface 94 forms the underside of stop flange 92.

A mounting bracket 96 extends laterally outward from extended body portion 88, and a rocking member 98 is attached to or formed with mounting bracket 96. In the illustrated embodiment, the width of mounting bracket 96 is slightly less than the width across gap 72 in front wall 70, and the width of rocking member 98 is slightly less than the width of each female T slot 58, 60, 62 measured between opposed side walls 68, such that rocking member 98 is adapted to be readily inserted in and advanced along a T slot 58, 60, 62, as seen in FIG. 4. The surface of rocking member 98 in the illustrated embodiment comprises a plurality of rounded and flat surfaces 100 for purposes to be explained.

A pair of locking nubs 102 extend laterally outward from opposite sides of a central sidewall portion of extended body portion 88. In the illustrated embodiment of FIGS. 3 and 4, the top to bottom length of locking nubs 102 is substantially equal to the vertical opening dimension of first widened portion 74 of gap 72. The configuration of locking nubs 102 is such that the nubs have sufficient flexibility to be compressed while moving in gap 72 towards portion 74 of gap 72.

Figure 9:
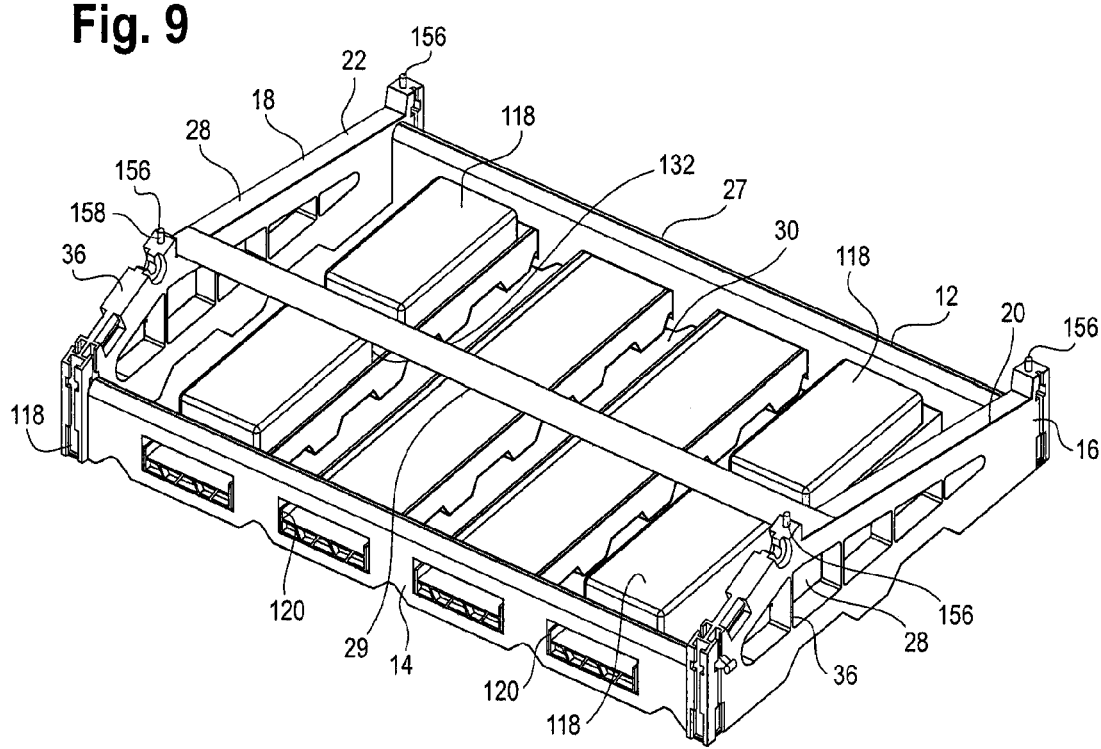
FIG. 9 is a perspective view of the support module of FIG. 1 with the PV solar panel removed and showing the support trays holding the weight material.
Figure 10:
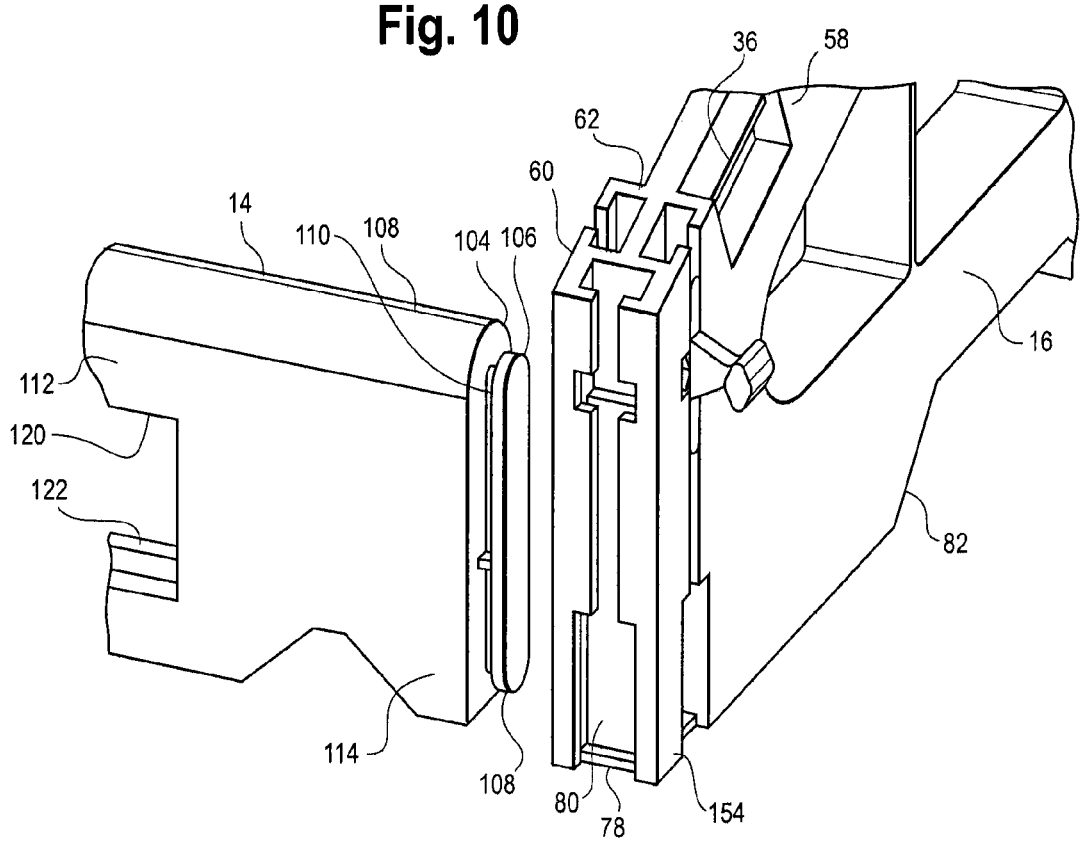
FIG. 10 is a detail perspective view of a corner of the support module of FIG. 1, showing a rear panel about to be inserted into a slot in a side panel.

The female T slots 58, 60, 62 in each corner of support module 10 also serve the purpose of enabling the front and rear panels 12, 14 to be easily and rapidly assembled at the factory or at an assembly facility to the side panels 16, 18. In this manner, the support module 10, including the front, rear and side panels 12, 14, 16 and 18, and access panel 42, as well as solar panel 24, micro-inverter 56 and the other components making up support module 10, can be shipped fully assembled to an installation site in a relatively small and lightweight package. At the installation site, all that is necessary is to mechanically interconnect the modules, to electrically connect the micro-inverters to each other, and to add weight material. As seen in FIGS. 9 and 10, at least one of the female T slots 58, 62 on side panel 16, 18 faces an opposed T slot 62, 58 on an opposed side panel 16, 18 when the support module 10 is in its pre-assembled condition (FIG. 10). Both ends 104 of each front and rear panel 12, 14 include a raised flange 106 having rounded ends 108. Raised flange 106 is supported on panel and 104 by a support member 110, forming a gap 112 between the lateral extent of flange 106 and panel end 104. The lateral extent of flange 106 is slightly less than the distance between sidewalls 68 of T slots 58, 62, and the width of support member 110 is slightly less than the width of gap 72 in front wall 70 of each T slot 58, 62. A stop member 114 is located in gap 112 for purposes to be explained.

As seen in FIG. 9, support module 10 also includes a plurality of trays 116 adapted to support weight materials 118, such as bricks, concrete blocks, metal blocks, or the like. The weight materials 118, when supported by trays 116, provide a ballast force holding support modules 10 onto the rooftop where the modules 10 are arrayed, against lift forces created by wind movement across the support modules. In the present invention, the trays 116 are configured to be readily assembled at the factory or at an assembly station, between front panel 12 and rear panel 14, enabling shipment of each support module 10 in a fully assembled condition to an installation site.

Figure 11:
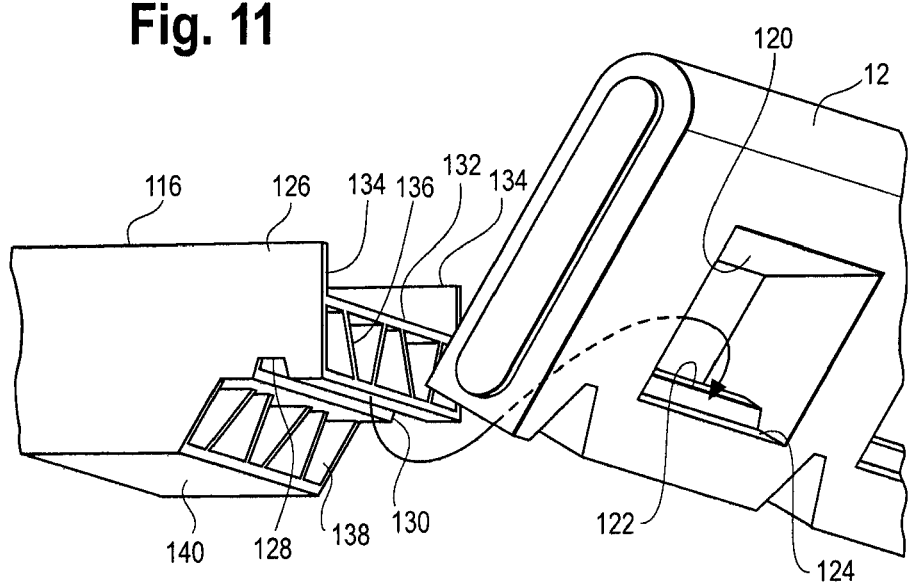
FIG. 11 is a detail perspective view of a front or a rear panel of the support module of FIG. 1, showing a support tray about to be attached to the front or real panel.

Referring to FIG. 9, each front and rear panel 12, 14 includes a plurality of apertures 120. Each aperture 120 in front panel 12 is aligned with a corresponding opposed aperture 120 in rear panel 14. Referring to FIG. 11, each aperture 120 includes a raised bottom tray support member 122 extending upward from a bottom ledge 124 of the aperture. Each tray 116 includes an end flange 126 having a groove 128 extending laterally along a lower brace surface 130 of the tray. Groove 128 is configured to receive each tray support member 122 in a nesting relationship when end flange 126 of each tray 116 is inserted into an aperture 120.

Figure 12:
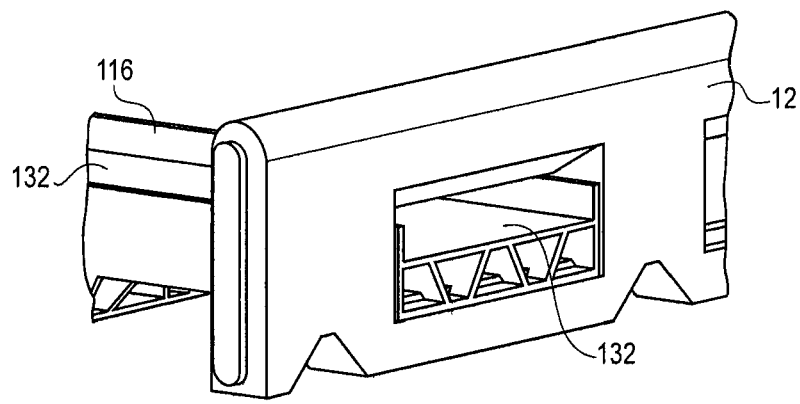
FIG. 12 is a perspective detail view of a support tray of FIG. 11 properly attached to a front or rear panel of the support module of FIG. 1.
Figure 13:
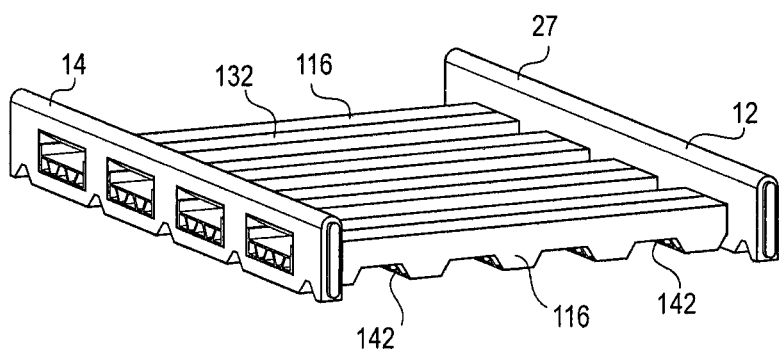
FIG. 13 is a perspective detail view of the front and rear panels of the support module of FIG. 1, showing a plurality of support trays attached to the front and rear panels.

In the illustrated embodiment of FIGS. 11-13, each tray 116 includes a support surface 132 adapted to support weight materials 118 as seen in FIG. 9. A pair of sidewalls 134 (FIG. 11) extend upward and downward from support surface 132. The portion of sidewalls 134 extending upward prevent lateral shifting of the weight materials 118 when disposed on the support surface 132. The lower extent of each sidewall 134 is attached to lower brace surface 130, and a plurality of brace members 136 extend between support surface 132 and lower brace surface 130 along the length of each tray. For added support for the weight materials 118, a second plurality of brace members 138 extends from beneath lower brace surface 130 to a tray foot member 140. Each tray foot member 140 extends laterally across the underside of a respective tray. In the lengthwise direction, as seen in FIG. 13, each foot member is interrupted by a gap 142 that allows air to pass beneath the support module 10 when the support module is placed on a rooftop, and the foot members may or may not be in contact with the rooftop, depending upon the variable or undulating surface of the rooftop. In the illustrated embodiment, the support module 10 is configured to hold four weight material support trays 116. However, circumstances may exist where a lesser amount of trays 116 may be sufficient, and superfluous trays may be removed without diminishing the integrity or capability of each support module 10.

Referring to FIGS. 16 and 17, each support module 10 includes an individual micro-inverter, or other suitable inverter, to convert the DC electrical energy generated by solar panel 24 to AC energy. An exemplar micro-inverter 56 suitable for use with the present invention is shown in FIG. 17, and comprises an Enphase Micro-Inverter Model M-175-24-208-5, available from Enphase Energy, Inc., 201 1$^{st}$ Street, Suite 111, Petaluma, Calif. 94952. Referring to FIG. 17, micro-inverter 56 comprises a housing 144 inside of which are the electronic components necessary to convert DC energy to AC energy. A pair of plugs 146 electrically connect micro-inverter 56 to solar panel 24. A pair of connector cables 148, 150 are each adapted to electronically connect micro-inverter 56 to the micro-inverter embedded in an adjacent support module 10 in an array, thus providing a collective energy grid comprising all of the solar panels 24 in a given array. In the illustrated embodiment, mounting brackets 152 are used to attach micro-inverter 56 to a section of support module 10, such as on access panel 42 as seen in FIG. 16. However, micro-inverter 56 can be suitably mounted on other sections of support module 10 as desired. Each micro-inverter 56 is capable of individually monitoring the performance of each solar panel 24 to which the micro-inverter is connected through plugs 146. Thus, each separate solar panel 24 may be continually monitored through its associated micro-inverter 56, and if the performance of the individual solar panels falls below minimum established criteria, or is damaged, the individual sub-par solar panel 24 and its entire associated support module 10 may be removed from the solar panel array and replaced with a fully performing support module and solar panel while the sub-par unit is repaired or discarded.

To assemble the support module 10 described above, and referring to FIGS. 11-13, the first recommended step is to insert tray support member 122 of front and back panels 12 and 14 into a corresponding groove 128 in each side of a tray. If four weight material trays 116 are desired in the assembly, the completion of the first assembly step will result in the trays being supported by front and rear panels 12, 14 as shown in FIG. 13. If less than four trays 116 are sufficient, one or two of the inner trays can be omitted from this assembly step.

The next assembly step is the attachment of the side panels 16, 18 to the front and rear panels 12, 14. Referring to FIG. 10, a raised male flange 106 on an end 104 of one of the front or rear panels is located adjacent female T slot 62 of one of the side panels 16, 18. The side panel 16 is lifted upward, and the upper round end 108 of raised flange 106 is inserted into T slot 62. Side panel 16 is then lowered as raised flange 106 advances upward into T slot 62. The dimensions of raised flange 106 are such that a stable fit is achieved between the side walls 68, back wall 66 and front wall 70 of T slot 62, and raised flange 106. Raised flange 106 advances into T slot 62 until stop member 114 abuts surface 154 of second widened portion 80 of gap 72. At this point, the bottom surfaces of side panel 16 and front or rear panel 12, 14 are co-planer, and the panels are held together in a stable fit.

The above-described assembly steps are repeated at the opposite end of side panel 16, and then again at both ends of side panel 18, until the assembly shown in FIG. 9, without weight material, is constructed. The construction thus far completed will hold trays 116 in their desired positions. Next, in the illustrated embodiment, micro-inverter 56 is mounted to access panel 42 adjacent one of apertures 52 by means of mounting brackets 152 (FIG. 17). It is understood that micro-inverter 56 could also be mounted on another suitable portion of support module 10 if desired.

Solar panel 24 is then suitably attached to upper surface 27 of front panel 12 and to beam 29 (FIG. 9) using screws 26 (FIG. 15). or other suitable fasteners or integral mounting structures. Wires from the solar panel 24 are then electrically connected to plugs 146 (FIG. 17) of the micro-inverter 56 attached to the support module 10. In this manner, the individual solar panel 24 mounted on a support module 10 is electrically connected to the individual micro-inverter 56 also mounted on the same support module, with the ability of the micro-inverter to monitor the performance of the associated solar panel.

The next step in the assembly process of the illustrated embodiment is to insert pivot pins 40 on both sides of access panel 42 into grooves 38 of the rear flat surfaces 36 of side panels 16, 18, as seen in FIGS. 1, 7, and 8. As access panel 42 pivots in grooves 38 and contacts rear flat surface 36, latch 50 engages flange 48 (FIGS. 7, 8) on both sides of access panel 42 to maintain access panel 42 in its closed position as seen in FIG. 7. Access panel 42 remains in the closed or latched position until manual or machine pressure is applied to disengage latch 50 from flange 48, allowing access panel 42 to pivot upward to the position shown in FIG. 16. Access panel 42 acts as a wind deflector when in the closed position, as will be explained.

The next step in the assembly process of the illustrated embodiment is to assemble each of the male pivot connectors 82 to the support module 10. As stated previously, each corner 64 at an end of side panels 16 and 18 includes a plurality of female T slots 58, 60 and 62. As illustrated in FIGS. 3 and 4, one of the T slots 60 in the illustrated embodiment is used to attach a front or rear panel 12, 14 to the side panels 16, 18. The remaining two T slots are adapted to receive and hold flexible male pivot connector 82 for the purpose of flexibly connecting separate, adjacent support modules together in both the side by side directions, and the front and back directions, as seen in FIGS. 5 and 5A. Referring to FIG. 3, the lower rounded edge 86 of male pivot connector main body 84 is inserted downward, as viewed in FIG. 3, into T slot 58. As main body 84 advances downward between walls 66, 68 and 70 of T slot 58, extended body portion 88 of male pivot connector 82 extends into gap 72 in front wall 70. Also, mounting bracket 96 extends through gap 72 as rocking member 98 also moves downward with bracket 96. The downward movement of pivot connector 82 in T slot 58 is halted when flat surface 94 of stop flange 92 contacts stop member 76 in T slot 58 (FIG. 3). Simultaneously, locking nubs 102 on both sides of extended body portion 88 of pivot connection 82 snap outward into engagement with the walls forming first widened portion 74 of gap 72. Thus, male pivot connector 82 is prevented from further downward movement in T slot 58 (FIG. 4) when flat surface 94 of stop flange 92 abuts stop member 76, and rocking member 98 is held in place by the expansion of locking nubs 102 into first widened position 74 of gap 27 in T slot 58.

FIGS. 3 and 4 illustrate the insertion of a male pivot connector 82 in one T slot 58 when it is desired to flexibly attach at least two support modules 10 side by side. It is understood that an additional male pivot connector 82 is similarly inserted in a laterally outward facing T slot located at the opposite end of side panel 16. The present invention also contemplates that male pivot connectors 82, including rocking member 98, may be integrally molded with the side and/or front or rear panels of module 10.

It is also contemplated within the scope of the illustrated embodiment of the present invention that support module 10 can be arrayed front to back in addition to side by side. Both ends of each side panel 16, 18 include forward and rearward facing female T slots 60 that are configured the same as lateral facing T slots 58, 62. Thus, forward and rearward facing T slots 60 are also capable of receiving and holding a male pivot connector 82 in the same manner as T slots 58 and 60 receive and hold a pivot connector 82. In a typical rooftop array, a given support module 10 may have other support modules flexibly attached, whereby a pivot connector 82 will be inserted in the lateral facing T slots on one side panel, but not the opposite side panel. Likewise, in the illustrated embodiment, male pivot connectors 82 will be inserted in either the forward or rearward facing T slot, but not both. In this configuration, two rocking members 98 will extend laterally outwardly from one side panel 16, 18 but not the other, and two additional rocking members 98 will extend either forwardly or rearwardly from the front or rear end of each side panel 16, 18. As will be explained, with male pivot connectors 82 and rocking members 98 inserted in designated T slots 58, 60 and/or 62 as described above, each support module 10 can be readily attached to another adjacent support module 10, as explained below.

To interengage one support module 10 to a second support module 10, such as illustrated in FIGS. 5, 5A and 6, with male pivot connectors 82 inserted in their designated T slots and rocking members 98 extending outward from the designated T slots as shown in FIG. 4, a second support module 10 is lifted such that the rocking member 98 of one of the male pivot connectors 82 of the first module 10 is placed adjacent the bottom of the corresponding T slot of the second support module. The second support module 10 is then lowered with rocking member 98 entering and advancing upward in the T slot of the second module 10 until the second support module contacts the underlying rooftop. The rocking member of the first support module is located at or near first widened portion 74 of gap 72 of the second module 10. The height and length dimensions of rocking member 98 are greater than the height and length dimensions of first widened portion 74, and rocking member 98 is prevented from being removed from the T slot of the second module 10 by the front wall 70 adjacent gap 72 of the T slot into which rocking member 98 has been inserted.

Figure 2:
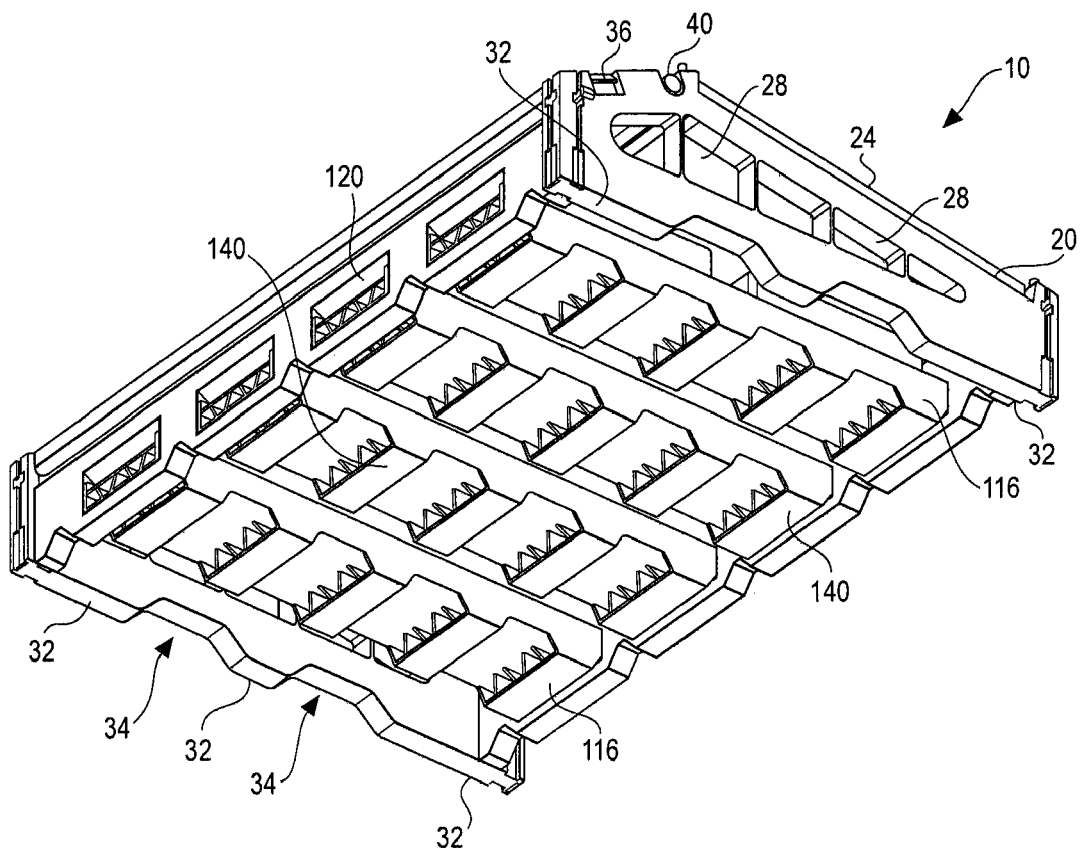
FIG. 2 is a perspective view of the underside of the solar panel support module of FIG. 1, showing the underside of the trays that support weight materials.

When interengaging two support modules 10 as described in the previous paragraph, a second male pivot connector 82 may be inserted, as shown in FIG. 4, into the outwardly facing female T slot at the opposite end of side member 16 [shown in FIGS. 1 & 2]. As the first rocking member 98 is inserted into a corresponding T slot of a second adjacent support module 10, the second rocking member 98 is also inserted into the corresponding T slot of the second adjacent module 10 until the second rocking member 98 is located adjacent the first widened portion 74 of gap 72 of the corresponding T slot. In this manner, the first and second adjacent modules 10 are flexibly interengaged with each other, as seen in FIG. 5.

FIG. 5 illustrates the flexibility of the connection between two adjacent support modules 10 when placed on an uneven rooftop surface. The second support module 10 is capable of pivoting around the rounded and flat surfaces 100 of rocking member 98 inserted into the corresponding T slot in the second support module 10, shown on the right in FIG. 5 when the second support module 10 is placed on a portion of the rooftop that has a different surface angle than the rooftop portion supporting the first support module 10 shown on the left in FIG. 5. Rocking member 98 has the inherent strength and the dimensions to remain in its corresponding female T slot as one support module 10 pivots around the rocking member.

After two or more support modules 10 have been physically and pivotally interengaged with each other, as described above and shown in FIG. 6, one of connector cables 148, 150 (FIG. 17) leading from the micro-inverter 56 in the first support module 10 is attached to one of the connector cables 148, 150 leading to the micro-inverter 56 in the adjacent second, flexibly attached support module 10. One of the connector cables 148, 150 leading from each micro-inverter 56 will have male connecting pins, and the other connector cable will have a female receptacle, enabling a serial connection between all of the micro-inverters 56 of a plurality of interengaged support modules 10. After all of the micro-inverters 56 of a given array of solar panels 24 have been interconnected, an outlet cable (not shown) connected to one of the micro-inverters 56 at the perimeter of the array is electrically connected to the electrical service system for the building upon which the solar panel array has been installed.

In a typical installation of an array of solar panel support modules in the Northern Hemisphere, each module 10 will be placed with its front panel 12 facing in a southerly direction, with the rear panel 14 facing north. To hold the arrayed modules down on the rooftop and avoid the need to pierce the rooftop with nails, screws, bolts, or the like, one or more weight materials 118, such as bricks, concrete blocks, metal blocks, or the like, are placed on trays 116 (FIG. 9) as needed to weigh each module 10 down pursuant to the local building codes and regulations that establish the wind speeds the solar panel array must be able to withstand prior to failure. The weight materials 118 can then be placed on trays 116 after the solar panel modular array has been situated on the rooftop in the illustrated embodiment by pivoting each access panel 42 upward into the position shown in FIG. 16. The weight materials 118 can be inserted on trays 116 beneath solar panel 24. The access panel 42 is then rotated back to its closed position as shown in FIG. 14.

Access panel 42 when in its closed position (FIG. 14) acts as a wind deflector to divert wind up and over the module 10 and over the solar panel 24. The wind deflection provided by access panel 42 reduces the amount of wind that reaches the underside of the solar panel 24, thereby reducing the lift force on the solar panel, and thereby reducing the amount of weight material 118 necessary to ballast the support module 10. In addition, the support modules 10 of the present invention are mechanically interengaged with each other such that the weight of the module 10 to the north of a given module, for example, will assist the module to the south in counteracting lift forces developed by the wind. In the illustrated embodiment, the wind diversion properties of access panel 42 will also provide a downward force on module 10. The functioning of access panel 42 can be compared to the function of a spoiler on an automobile that generates additional downward force on the vehicle as speed increases and the air passes over the spoiler at a higher speed. In the same manner, wind at higher speeds passing over access panel 42 increases the downward air force applied to module 10.

The support module 10 of the present invention also provides for the dissipation of heat generated by the sun bearing on the solar panel 24, and by the operation of the solar panel 24. Heat dissipation is necessary because the power output and conversion efficiency of the solar panel decreases as the solar panel's temperature increases above a certain level. Referring to FIG. 1, air flows through channels 34 and beneath solar panel 24 to carry heat away from the bottom of the solar panel 24. Wind will also flow through volume 30 via the additional apertures and channels in the side, front and rear panels 12, 14, 16, 18. In addition, as the wind passes over access panel 42, a portion of the air is deflected by louvers 54 to the volume 30 beneath solar panel 24. This air is primarily moving downward, and does not create significant lift forces beneath the solar panel. The air passing through louvers 54 does, however, assist in the dissipation of heat generated beneath the solar panel.

The present invention, as described above, provides a unique system for constructing a solar panel array on a rooftop, or other desired surface, which system comprises a plurality of similarly configured, interengaged and selectively removable and replaceable support modules 10, with each support module 10 having an individual solar panel attached to the module, and each support module also including an individual micro-inverter that converts the DC energy generated by the solar panel to AC energy. Because of the flexible and manually insertable and removable male pivot connectors 82 used to attach adjacent support modules 10 of the present invention, and the detachable connector cables 148, 150 that electrically connect one micro-inverter 56 to another, any given module 10 can be removed from an existing array in which the module 10 is installed, and the removed module 10 can be installed in another array by using the connection steps set forth above. In this manner, faulty solar panel modules 10 may be easily removed and replaced in a given solar panel array. Further, support modules 10 with attached solar panels 24 and micro-inverters 56 can be banked in a suitable storage location and taken to an installation site as needed to replace faulty modules or add to the existing capacity of a given solar panel array. Also, the configuration of each support module 10 allows the modules to be deployed in a neat stack when not in use.

Figure 18:
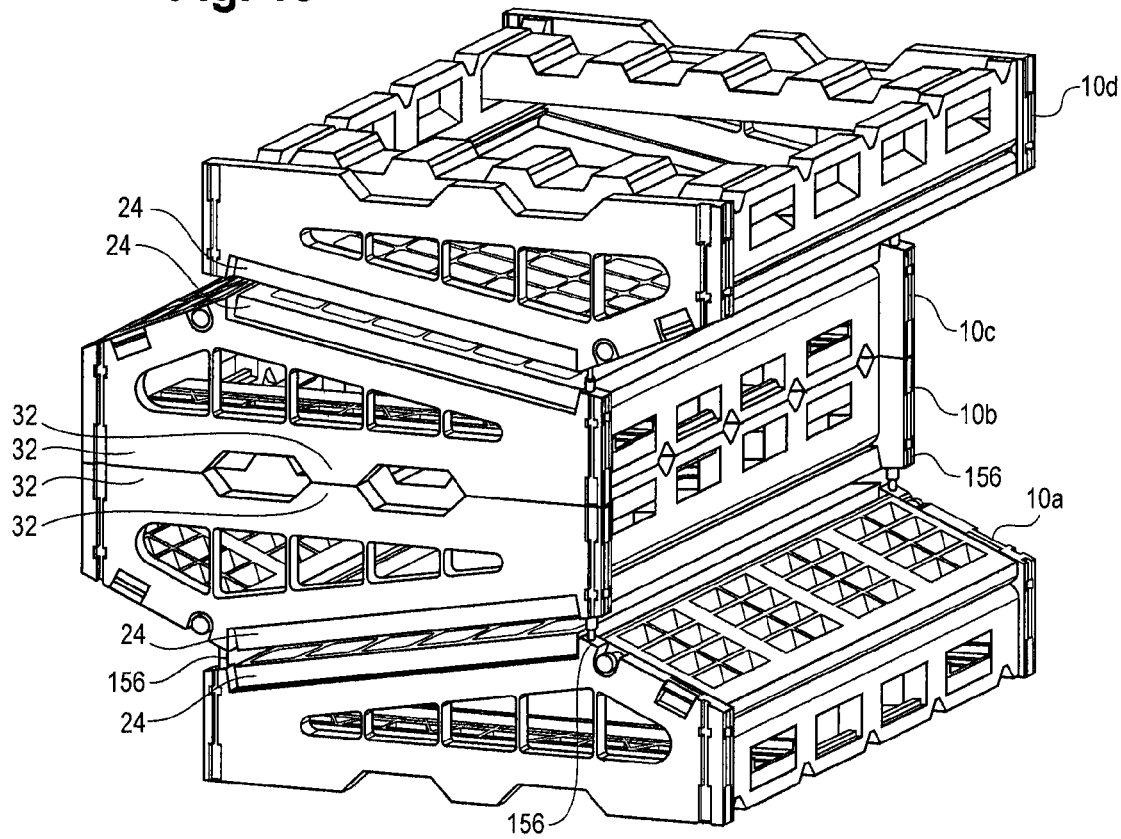
FIG. 18 is a perspective view of a plurality of the support modules of FIG. 1 formed into a stack for shipment or storage.

Each support module 10, with solar panel 24 and micro-inverter 56 attached, is configured to be assembled at the factory or assembly facility, and shipped in a compact package containing several support modules ready for installation at the site. Referring to FIG. 18, a stack comprising four support modules 10 is illustrated, showing the modules prior to being banded or strapped together, or wrapped in a suitable shipping covering. While FIG. 18 shows a stack of four support modules 10, it is understood that stacks comprising more or less than four support modules can be assembled and shipped.

As seen in FIGS. 1 and 9, each side panel 16, 18 of a support module 10 includes an upwardly extending stacking pin 156 adjacent the corners of solar panel 24. Near each pin 156 on side panels 16, 18 is an aperture 158 (FIGS. 1, 9, 15) having a diameter slightly larger than the diameter of each stacking pin 156, allowing each stacking pin 156 to be smoothly inserted into and removed from a corresponding aperture 158 when forming the stack, or when unstacking the modules.

Referring to FIG. 18, lower support module 10A is placed on the ground floor or other surface at the factory or assembly facility, and a second module 10B is placed on top of module 10A, with module 10B in an inverted position. The stacking pins 156 of both modules 10A and 10B are inserted into corresponding apertures 158 of the other module. Solar panels 24 of each module 10A, 10B are spaced apart from each other, so as not to damage the integrity of the solar panels during shipping, due to the solar panels being recessed below the upper surfaces of the portions of side panels 16, 18 extending above the plane of the respective supported solar panel, and due to the stacking pins 156 being able to be inserted into apertures 158 only to a limited distance calculated to keep the solar panels from contacting one another.

Next, the feet 32 of support module 10C in its upright position are placed over the upwardly facing feet 32 of inverted module 10B, such that module 10C is supported by the feet 32 of module 10B. The bottom surfaces of feet 32 of each support module 10 include grooves, rubber pads, or other suitable friction elements that prevent module 10C from sliding relative to module 10B when the feet 32 of each module are in contact with each other.

Once support module 10C has been properly placed over module 10B, module 10D is placed in an inverted position over module 10C. Stacking pins 156 on both modules 10C, D are inserted into corresponding apertures 158 as explained with reference to the stacking of modules 10A and 10B, thus holding inverted support module 10D in place over module 10C, with a space between the solar panels. If desired, additional support modules 10 can be added to the stack shown in FIG. 18, within practical limits.

After a plurality of modules 10 have been formed into a stack, as shown in FIG. 18, a band, strap or other holding means is wrapped around the stack, holding each module 10 in engagement with an adjacent module and providing a stable stack of modules. The stack of support modules can then be shipped to an installation site without fear of damage to the sensitive solar panels or micro-inverters. If desired, once banded or strapped, the stack of support modules may be wrapped in a paper, cardboard or plastic material prior to shipping for added protection. In addition, the support modules 10 may be conveniently stored when in the stack shown in FIG. 18.

The foregoing description of the illustrated embodiment of the invention has been presented for purposes of illustration and description, and is not intended to be exhaustive or to limit the invention to the precise form disclosed. The description was selected to best explain the principles of the invention and practical application of these principals to enable others skilled in the art to best utilize the invention in various embodiments and various modifications as are suited to the particular use contemplated. It is intended that the scope of the invention not be limited by the specification, but be defined by the claims set forth below.

We claim:

1. A solar panel array support system comprising:
   a plurality of support modules, each support module having a substantially similar configuration, each support module adapted to support at least one PV solar panel capable of generating electrical energy;
   each support module having two side panels disposed substantially parallel to each other;
   each support module further having a front panel and a rear panel disposed substantially parallel to each other;
   each of said front panel and said rear panel having a slot and a connector;
   each said side panel having a side panel slot and a side panel connector, each side panel slot engagingly connected with the connector of either the front panel or the rear panel such that the side panel is engagingly connected to both the front panel and the rear panel thus forming the support module;
   wherein the side panel slot and the side panel connector of each of said side panels form a flexible connection when engagingly connected to the connector and slot of the front panel and the rear panel;

each said support module removably interengaged with an adjacent support module to form an array of said plurality of support modules;

each support module including at least one male pivot connector extending outwardly from said support module;

each support module including at least one female connector element receiving said at least one male pivot connector when said support module is interengaged with said adjacent support module;

said at least one male pivot connector permitting relative rotational movement between said interengaged support modules;

said at least one female connector element is selected from the group consisting of the slot and the side panel slot, said at least one female connector element adapted to receive said male pivot connector;

said male pivot connector supporting a rocking member, said rocking member inserted into the slot of said female connector element in said adjacent interengaged support module when said support modules are pivotally interengaged; and each said support module adapted to support a first DC-AC inverter, each said first DC-AC inverter adapted to be electrically connected to the solar panel supported by said support module, each said first DC-AC inverter also adapted to be electrically connected to and disconnected from a second DC-AC inverter, said second DC-AC inverter supported by said adjacent support module and electrically connected to at least one solar panel supported by said adjacent support module.

2. The solar panel array support system of claim 1, wherein each said DC-AC inverter is mounted to a portion of one of said support modules.

3. The solar panel array support system of claim 1, wherein:
each said support module is flexibly and removably interengaged with said adjacent support module.

4. The solar panel array support system of claim 1, wherein:
each said slot and said side panel slot includes a stop member located at a predetermined position in said slot and said side panel slot, said male pivot connector being inserted into said slot and said side panel slot and abutting said stop member.

5. The solar panel array support system of claim 4, wherein:
each said side panel has front and rear ends, each said front and rear end including a plurality of said side panel slots.

6. The solar panel array support system of claim 5, wherein:
each of said plurality of said side panel slots in said side panels are uniformly configured.

* * * * *